United States Patent [19]

Miyahara

[11] 3,873,742

[45] Mar. 25, 1975

[54] PROCESS FOR PRODUCING WRAPPED FOODS

[75] Inventor: Kingo Miyahara, Tokyo, Japan

[73] Assignee: Kabushiki Kaisha Dowa, Tokyo, Japan

[22] Filed: Feb. 9, 1973

[21] Appl. No.: 330,985

[52] U.S. Cl.................. 426/234, 426/407, 426/412, 426/523
[51] Int. Cl............................................. A23l 3/32
[58] Field of Search ............ 426/234, 407, 412, 1.3, 426/523, 107, 243, 112, 237, 244, 245, 247; 99/358

[56] References Cited
UNITED STATES PATENTS

| | | | |
|---|---|---|---|
| 1,961,681 | 6/1934 | Bohart | 426/234 |
| 2,182,383 | 12/1939 | Lang | 426/234 |
| 2,405,984 | 8/1946 | Sharpe | 99/358 |
| 2,939,793 | 6/1960 | Richman | 426/107 |

FOREIGN PATENTS OR APPLICATIONS

| | | | |
|---|---|---|---|
| 8,301 | 1902 | United Kingdom | 426/246 |
| 596,746 | 4/1960 | Canada | 426/246 |

*Primary Examiner*—Samih N. Zaharna
*Assistant Examiner*—Ernest Therkorn
*Attorney, Agent, or Firm*—Hill, Gross, Simpson, Van Santen, Steadman, Chiara & Simpson

[57] ABSTRACT

In a process for producing a wrapped food by charging a material foodstuff into a wrapping tube, sealing the opposite ends of said wrapping tube and conducting a current through said foodstuff to ripen and sterilize said foodstuff by the Juole heat generated therein, an electrical contact member made of fibers impregnated with a salt solution having a concentration equal to or higher than that of the salt contained in said foodstuff for making the fibers electrically conductive is disposed at each end of said wrapping tube and the opposite ends of said wrapped tube are bound together with said electrical contact member in such a manner that said material is partially exposed to the outside from each end of said wrapping tube for contact with electrode plates through which the current is passed through said foodstuff.

10 Claims, 8 Drawing Figures

PATENTED MAR 25 1975 3,873,742
SHEET 1 OF 3
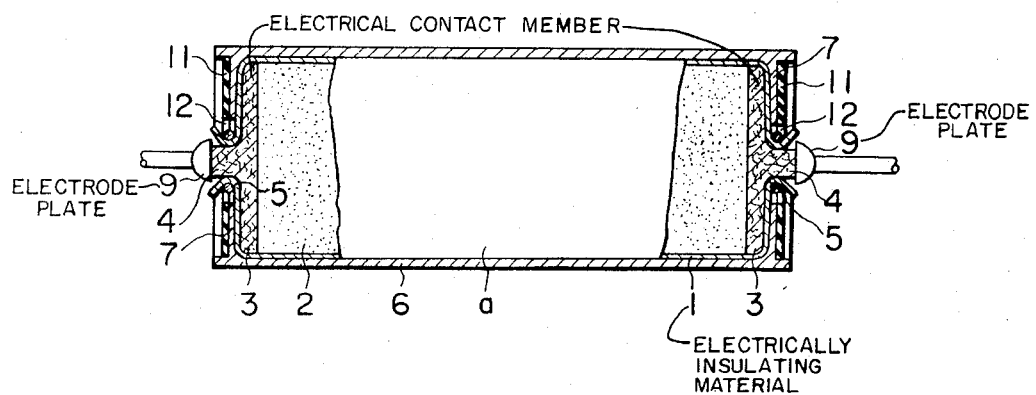
FIG. 1
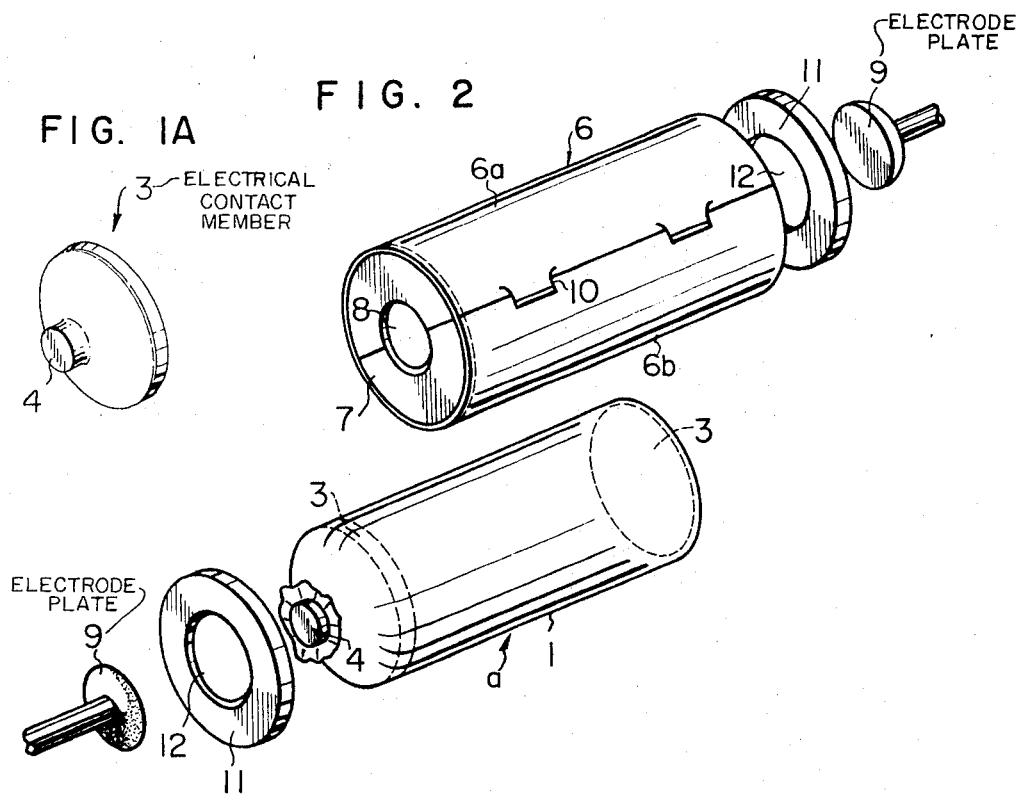
FIG. 1A
FIG. 2

PROCESS FOR PRODUCING WRAPPED FOODS

This invention relates to a process for producing novel and improved wrapped foods. More specifically, the invention relates to a process for producing wrapped kneaded foods, such as ham, sausage, press ham and boiled fish-paste, by processing the foodstuffs positively in a short period of time, simply by conducting a current through said foodstuffs as they are wrapped.

The present inventor has previously developed a process for producing wrapped foods, which comprises charging a desired material foodstuff into a thin wrapping tube unit consisting of a central body portion made of an electrically insulating material and end portions made of an electrically conductive metallic material, binding said electrically conductive end portions to seal the foodstuff in said tube unit, placing the foodstuff-sealing tube unit in a closed container, interposing the container between opposed electrode plates with the expanding ends of said tube unit in close contact with said electrode plates respectively, and conducting a current across said electrode plates, whereby the foodstuff sealed in said tube unit is sterilized and ripened by the heat generated therein. This process has achieved a considerable effect, and by employing the process in the production of wrapped foods, the production time can be shortened remarkably and the tastes of foods can be improved as compared with the wrapped foods produced by conventional processes.

The process described above, however, has had the disadvantage that since the thin metallic film is used at the opposite end portions of the tube unit for conducting the current through the foodstuff sealed in the tube unit, it is inevitable for said metallic film to be electrolytically attacked by the salt contained in the foodstuff and thus subjected to deterioration and discoloration, with the result that the opposite end portions of the product wrapped food are somewhat browned, degrading the commercial value of the product.

It is, therefore, an object of the present invention to provide wrapped foods which are free of the above-described disadvantage caused by the previously proposed process of wrapped foods which are not subjected to electrolytical deterioration and discoloration, and further, to provide such improved wrapped foods efficiently in a short period of time and with a good taste.

Another object of the invention is to provide a process for producing a wrapped food consisting of a wrapping tube and a foodstuff consisting of a kneaded hard paste of a mixture of a material foodstuff, such as minced meat, salt and condiments and sealed in said wrapped tube, said wrapping tube comprising electrical contact member disposed in the opposite ends thereof and each made of a fiber pad impregnated with an amount of salt equal to or more than the amount of salt contained in said foodstuff for making the pad electrically conductive, and being sealed at the opposite ends with portions of said contact member exposed to the outside respectively.

Another important object of the invention is to provide a process for producing a wrapped food of the type described, in which said foodstuff in said wrapping tube is ripened and sterilized quickly, by holding the exposed portions of said electrical contact member in contact with electrode plates respectively and conducting a current through said foodstuff from one contact member to another.

A further object of the invention is to provide a process for producing a wrapped food of the type described, in which each of said electrical contact member is provided independently of or integrally with the main body of said wrapping tube in such a manner that the current may be conducted uniformly through said foodstuff, whereby said foodstuff is ripened and sterilized uniformly.

Other objects of the invention will become apparent from the following detailed descriptions of embodiments of the invention taken in conjunction with the accompanying drawings, in which:

FIG. 1 is a vertical sectional view of an apparatus for practicing the process of the invention;

FIG. 1A is a perspective view of one form of electrical contact member used in the process of the invention;

FIG. 2 is a developed view of the apparatus shown in FIG. 1;

Figure 3:
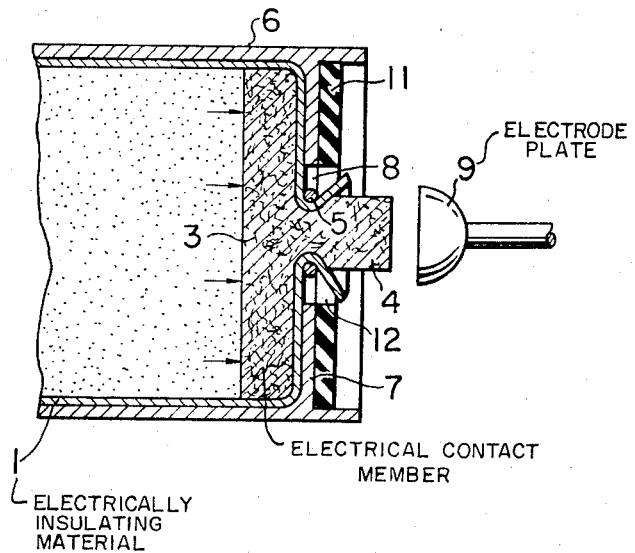
FIG. 3 is a sectional view showing, in an enlarged scale, a portion of the apparatus shown in FIG. 1 for facilitating the understanding of the arrangement of the electrical contact member and the electrode plate.
Figure 4:
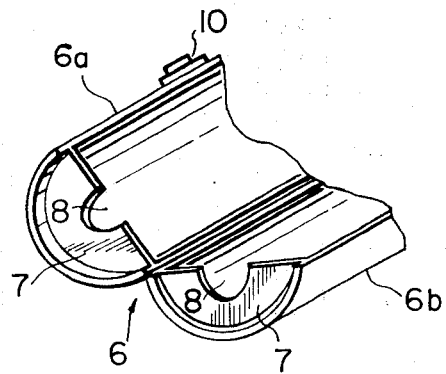
FIG. 4 is a fragmentary enlarged perspective view of the container.

An apparatus for practicing the process of this invention will be described with reference to FIGS. 1 through 3. Reference numeral 1 designates an electrically insulating wrapping tube made, for example, of a film of Krehalon (tradename). In the wrapping tube 1 is charged a hard paste-like foodstuff 2 obtained by kneading a mixture of mince fresh or other material foodstuff, salt and condiments. An electrical contact member 3 consisting of a fiber pad impregnated with a solution of salt having a concentration equal to or higher than that of the salt contained in the foodstuff 2 is disposed in each end portion of the wrapping tube 1, and then each end of said wrapping tube 1 is closed by binding it with a string 5, in such a manner that a portion of said contact member 3 is exposed to the outside, thereby to form an unprocessed wrapped food *a*. The face of the contact member 3 which is in contact with the foodstuff 2 is made substantially flat so that said face may be in close contact uniformly with the foodstuff over the entire area thereof. The unprocessed wrapped food *a* with the foodstuff thus sealed therein is placed in a container 6 which is provided with openings at the opposite ends thereof for projecting the exposed portions 4, 4 of the end plates 3, 3 outwardly therethrough. This container 6 may be made of an electrically conductive material and is made up of semicylindrical halves 6a, 6b connected with each other by means of hinges so as to be opened and closed to facilitate the accommodation of the unprocessed wrapped food *a*. Further, the container 6 is provided with latch means 10 by which the semicylindrical halves 6a, 6b of the container are tightly fastened together when said container is closed. Reference numerals 8, 8 designates the openings provided in the opposite end walls 7, 7 of the container 6 as stated above.

Electrode plates 9, 9 are arranged in opposed relation to each other and are respectively movable in the axial direction. These electrode plates 9, 9 are brought into close contact with the exposed portions 4, 4 of the electrical contact members 3, 3 respectively in a manner to compress the unprocessed wrapped food a, accommodated in the container 6, from both sides, for conducting a current through the foodstuff packed in said wrapping tube. Electrically insulating plates 11, 11 are attached to the container 6, respectively in contact with the outer surfaces of the opposite end walls 7, 7 of said container. Each of these electrically insulating plates 11, 11 is provided with an opening 12 centrally thereof for projecting the bound end of the unprocessed wrapped food a outwardly therethrough. These electrically insulating plates 11, 11 serve to prevent the liquid, oozing out from the wrapping tube through the bound ends thereof, from intruding into the container 6, and thereby to prevent a leakage of current to said container.

It should be understood that, while the container 6 in the embodiment described above is cylindrical in shape and not provided with vent holes in the peripheral wall thereof, it may be of any other shape, e.g. square or rectangular, in cross section and may be provided with vent holes of a suitable size.

Figure 5:
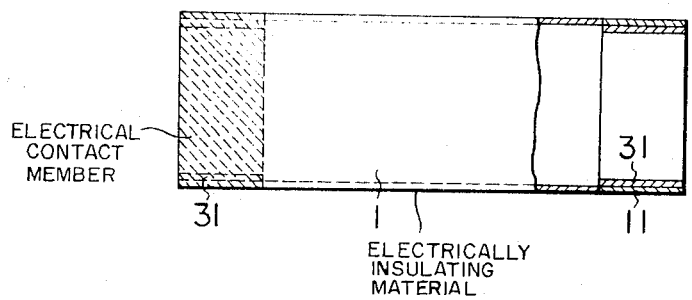
FIGS. 5 through 7 are sectional views respectively showing other forms of the contact member and wrapping tube.
Figure 6:
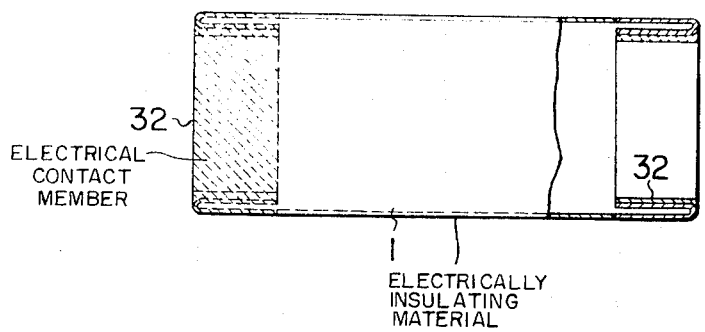
Figure 7:
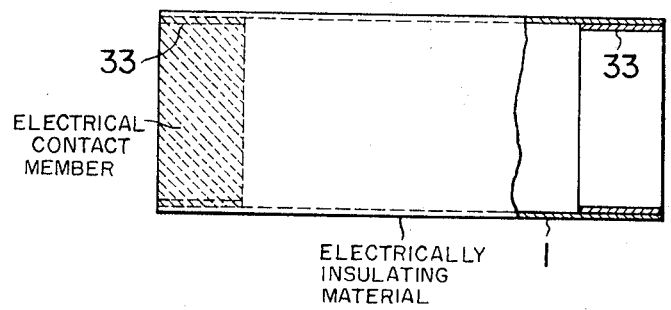

It should also be understood that, while the electrical contact member 3 consisting of a fiber pad are provided independently of the wrapping tube 1, they may be provided integrally with the opposite end portions of the wrapping tube 1 as shown in FIGS. 5 to 7. Namely, FIG. 5 shows a case wherein electrical contact members 31 made of a fibrous material and impregnated with an amount of salt equal to or more than the amount of the salt contained in the foostuff to be sealed in the electrically insulating wrapping tube 1 are provided in the form of a sleeve. Said sleeve like contact member 31 is attached to the inner side of the outer tube and connected integrally to the opposite ends of said wrapping tube 1 as continuous extentions of said wrapping tube 1. In this case, the foodstuff may be sealed in the wrapping tube 1 simply by binding said continuous extensions tightly by the strings 5 respectively. FIG. 6 shows a case wherein contact member 32, 32 are attached to the outer portions of both ends of the tube 1 and turned inwardly over the remaining portions. Such structure is advantageous in obtaining good electrical contact between the electrode plates 9 and the expanding ends of the contact members when said contact members are bound tightly by the strings 5 and contacted by said electrode plates.

FIG. 7 shows a case wherein salt-impregnated fibrous short tubes constituting electrical contact members 33, 33 are telescoped into the opposite ends of the wrapping tube 1 and integrally bonded to said wrapping tube. In this case, the foodstuff can be sealed in the wrapping tube 1 by binding the opposite end portions of the wrapping tube 1 together with the telescoped contact members 33, 33 by means of the strings 5 respectively.

In practicing the process of this invention, a hard paste-like foodstuff 2 obtained by mixing and kneading a mince meat or other material foodstuff, salt and condiments is charged into the wrapping tube 1 and then the opposite end portions of said wrapping tube 1 are bound tightly together with the contact members 3, 3 or sleeves 31, 31 or 32, 32 or short tubes 33, 33 which are previously impregnated with a solution of salt having a concentration equal to or higher than that of the salt contained in the foostuff, by means of the strings 5 in such a manner that portions 4, 4 of said pads, sleeves or short tubes may be exposed to the outside, whereby an unprocessed wrapped food a is obtained. Thereafter, the unprocessed wrapped food a is disposed in the container 6 consisting of two openable semicylindrical halves 6a, 6b in such a manner that the bound ends of said wrapped food are projecting outwardly through the openings 8, 8 formed in the opposite end walls 7, 7 of said container respectively. After fastening the halves of the container 6 by means of the latch means 10, the electrically insulating plates 11, 11 are fitted into the recessed ends of the container 6 and the electrode plates 9, 9 are brought into pressure contact with the exposed portions 4, 4 of the contact members 3, 3; 31, 31; 32, 32 or 33, 33. When a current is passed across the electrode plates 9, 9, it flows smoothly through the hard paste-like foodstuff 2, since the contact members 3, 3; 31, 31; 32, 32 or 33, 33 are impregnated with the salt solution at a high concentration, whereby said foodstuff is sterilized and ripened by the Joule heat generated therein, as being wrapped by the wrapping tube. Thus, a product wrapped food can be produced in a short period of time.

In the process of ripening and sterilization by the effect of Joule heat, the hard paste-like foodstuff sealed in the wrapping tube expands gradually and the salt solution oozing out from said foodstuff tends to move out of the wrapping tube. However, the salt solution is entirely absorbed by the contact members 3, 3; 31, 31; 32, 32 or 33, 33, so that said contact members are rendered electrically conductive more and more, ensuring that the current passes smoothly through the foodstuff throughout the ripening process and a tasteful excellent wrapped food is obtained.

According to the invention, as described hereinbefore, an unripened wrapped food a is prepared by charging a hard paste-like foodstuff into a wrapping tube 1 made of an electrically insulating material and sealing the opposite ends of said wrapping tube by binding them together with electrical contact members 3, 3 which are disposed at the opposite ends of said wrapping tune respectively and are each impregnated with salt at a concentration equal to or higher than that of the salt contained in said foodstuff, and then the wrapped food thus obtained is placed in the container 6 as it is, with protions 4, 4 of said contact member 3, 3, 31, 31, 32, 32, 33, 33 projecting outwardly from the opposite ends of said container, following which the electrode plates 9, 9 are applied to the outwardly projecting portions 4, 4 of said contact members 3, 3, 31, 31, 32, 32, 33, 33. Therefore, good electrical connection can be established between the electrode plates 9, 9 and the foodstuff sealed in the wrapping tube, through the contact members 3, 3, 31, 31, 32, 32, 33, 33 and the current can be conducted uniformly through the entire body of the foodstuff. Thus, a processed wrapped food uniformly ripened and sterilized can be produced in a short period of time without the trouble of electrolytic corrosion and the product wrapped food is of lasting commercial value as the end portions thereof are not liable to discoloration.

What is claimed is:

1. A process for producing a wrapped food, comprising charging a hard paste-like unprocessed foodstuff into a wrapping tube made of an electrically insulating material, and provided with a fibrous electrical contact member of nonmetallic material at each end thereof, said fibrous electrical contact member being previously impregnated with a salt solution having a concentration equal to or higher than that of the salt contained in said unprocessed foodstuff, closing the opposite ends of said wrapping tube by binding means in such a manner that said electrical contact member may be partially exposed to the outside from each end of said wrapping tube thereby to prepare a sealed unprocessed wrapped food, placing the sealed unprocessed wrapped food in a container with the outwardly exposed portions of said contact member projecting outwardly from both ends of said container, contacting electrode plates with the outwardly projecting portions of said contact member, and conducting a current across said electrode plates, whereby the unprocessed foodstuff sealed in said wrapping tube is ripened and sterilized by the heat generated therein as being wrapped.

2. A process for producing a wrapped food, according to claim 1, wherein said fibrous electrical contact member is provided independently of said wrapping tube.

3. A process for producing a wrapped food, according to claim 1, wherein said electrical contact member is a sleeve made of fibers and connected integrally with each end of said wrapping tube.

4. A process for producing a wrapped food, according to claim 1, wherein said electrical contact member is a short tube made of fibers and telescoped into each end of said wrapping tube.

5. A process for producing a wrapped food, according to claim 3, wherein the outer end portion of said sleeve is turned inwardly over the other portion thereof.

6. A process for producing a wrapped food, according to claim 1, wherein said container is cylindrical in shape and made up of two semicylindrical halves connected with each other by means of hinges and provided with interlocking means.

7. A process for producing a wrapped food, according to claim 1, wherein said container is squre in cross sectional shape.

8. A process for producing a wrapped food, according to claim 1, wherein said container is rectangular in cross sectional shape.

9. A process for producing a wrapped food, according to claim 1, wherein said container has vent holes formed in the peripheral wall thereof.

10. A process for producing a wrapped food, according to claim 1, wherein said container has recessed portions formed at the opposite ends thereof and an electrically insulating plate having a hole formed at the center thereof is fitted tightly into each of said recessed portions to prevent a fluid oozing out from the unprocessed wrapped food during the processing from flowing into said container and thereby to prevent a leakage of current to said container.

* * * * *